Dec. 20, 1938.   H. B. CLARKE ET AL   2,140,735
VISCOSITY REGULATOR
Filed April 13, 1935
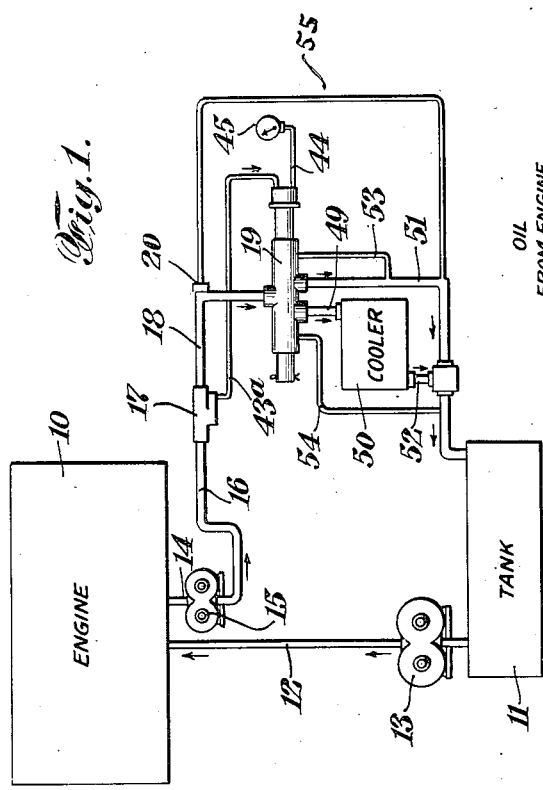
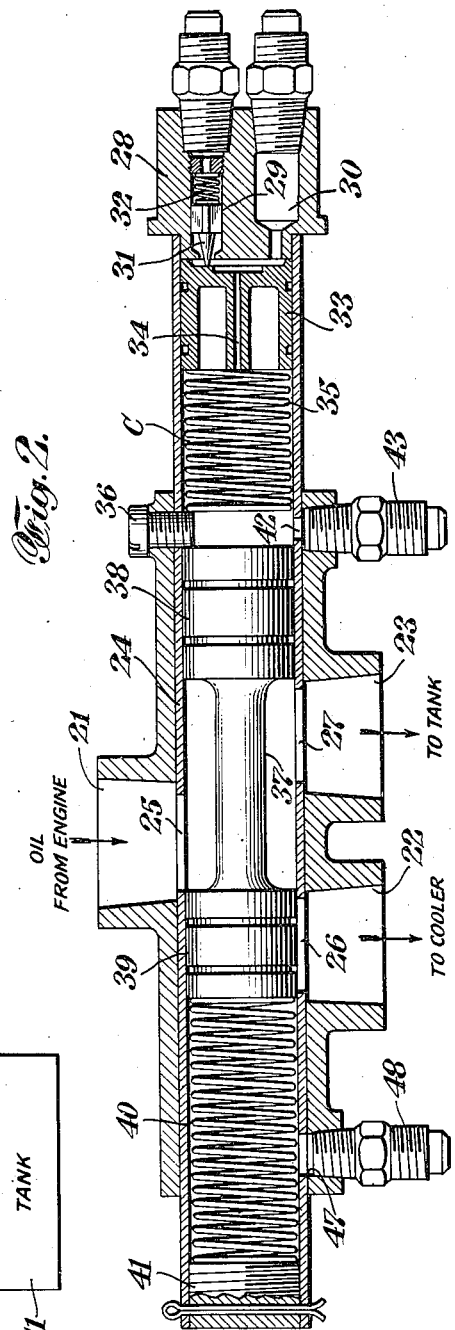
INVENTOR
Henry B Clarke
Harry F. Booth
BY
Kenyon & Kenyon
ATTORNEYS.

Patented Dec. 20, 1938

2,140,735

UNITED STATES PATENT OFFICE 2,140,735

VISCOSITY REGULATOR

Henry B. Clarke, Grosse Pointe, Mich., and Harry T. Booth, Glencoe, Ill., assignors, by mesne assignments, to Henry R. Gross, Chicago, Ill.

Application April 13, 1935, Serial No. 16,134

11 Claims. (Cl. 184—104)

This invention relates to viscosity regulators and has for an object a simple, inexpensive and efficient device for regulating the viscosity of the oil in the lubricating system of a dry sump internal combustion engine.

In the lubricating system of a dry sump internal combustion engine, a low pressure scavenging pump withdraws the oil from the sump and delivers it to a storage tank from which the oil is withdrawn by a high pressure pump which delivers the oil to the bearings and other parts of the engine to be lubricated. According to the present invention, a cooler is arranged in the oil path between the scavenging pump and storage tank and a by-pass is provided around the cooler. A chamber has an inlet communicating with said oil path between the scavenging pump and the by-pass and an outlet communicating with the by-pass, the inlet being either an orifice or a friction tube and the outlet being either a friction tube or an orifice. Means are provided to maintain constant the pressure difference across the inlet port and as a result the pressure within the chamber is a function of the viscosity of the oil flowing therethrough. The pressure within the chamber is applied to valve means for controlling the flow through the cooler and thus the viscosity of the oil in the system is prevented from dropping below a predetermined value.

Other objects, novel features and advantages of this invention will become apparent from the following specification and accompanying drawing, wherein:

Fig. 1 is a diagrammatic view of a system embodying the invention, and

Fig. 2 is a longitudinal section through the regulator.

The engine 10 is of the dry sump type and oil is supplied to the bearings thereof from a tank 11 through a pipe 12 by means of a high pressure pump 13. A pipe 14 leads from the engine sump to the intake of a pump 15 which discharges into a pipe 16. The pipe 16 leads to an aeration eliminator 17 from which the pipe 18 leads to a casing 19. In the pipe 18 there is provided a relief valve 20.

The casing 19 is provided with an inlet 21 and two outlets 22 and 23 respectively. A tube 24 fits tightly in the casing and is provided with ports 25, 26 and 27 registering respectively with the inlet 21, the outlet 22 and the outlet 23. The right-hand end of the tube 24 is closed by a plug 28 having two passages 29 and 30. In the passageway 29 is arranged a needle valve 31 which is pressed toward closed position by a spring 32. In the right hand end of the tube 24 is arranged a piston 33 through which extends a friction tube 34. A spring 35 is interposed between the piston 33 and the inner end of a screw 36, the piston 33 being thus pushed to the right by the spring into position to maintain the needle valve 31 in open position. A pistion valve 37 having heads 38 and 39 is slidably mounted in the tube to the left of the stop 36 and a spring 40 is interposed between the head 39 and a plug 41 closing the left hand end of the tube 24. The heads 38 and 39 are so arranged that with the head 38 engaging the stop 36, the ports 25 and 27 are open and as the piston is moved to the left against the action of the spring 40, the port 27 is closed and the port 26 opened. Opposite the stop 36, the tube 24 is provided with an outlet orifice 42 which communicates with a fitting 43 screwed into the casing 19.

The aeriation eliminator is of standard construction and is provided with a trap from which pipe 43a leads to the passageway 29 in the head 28. A pipe 44 leads from the passageway 30 to a gauge 45. A drainage opening 47 is provided in the tube 24 and a fitting 48 mounted in the casing 19 communicates therewith.

A pipe 49 leads from the outlet 22 to a cooler 50 and a pipe 51 leads from the outlet 23 to the tank 11. A pipe 52 leads from the cooler to the pipe 51 and a pipe 53 leads from the fitting 43 to the pipe 51. A pipe 54 leads from the fitting 48 to the pipe 51. A pipe 55 leads from the relief valve 20 to the pipe 51.

In the operation of this device, oil is drawn from the engine sump by a pump 15 and passes by way of pipes 16 and 18 into the tube 24 between the heads 38 and 39. Oil also passes by way of the pipe 43a and passage 29 into the right hand end of the tube. Oil from the passageway 29 passes past the valve 31 and through the friction tube 34 into the chamber C defined by the tube 24, the piston head and the piston 33 from where it escapes by way of the orifice 42. The pressure difference across the friction tube 34 is maintained constant by reason of the spring 35. Should the pressure difference times the piston area exceed the strength of the spring 35, the piston 33 will move to the left, thus permitting the needle valve 31 to move toward closed position and reduce the oil flow, thereby reducing the pressure difference across the friction tube whereupon the spring 35 will move the piston 33 to the right, thereby increasing the extent of opening of the valve 31 and thus regulating the flow to maintain constant the pressure difference across the friction tube. Since the rate of flow through a friction tube varies with oil viscosity and pressure difference, and the pressure difference across the friction tube is maintained constant, the rate of flow through the friction tube will vary inversely with viscosity. The amount of oil passing through the friction tube must pass through the orifice, and since the rate of flow through an orifice is substantially independent of viscosity, the pressure of the oil in the chamber C is a function of its viscosity.

When the engine is at rest, the piston 37 is in the position shown in Fig. 2 and the piston 33 is also in the position shown in Fig. 2. Upon starting the engine, with the oil cold, oil will flow from the engine to the tank by way of the port 27 and will also flow by way of the pipe 43a and passage 29 into the chamber C through the friction tube 34 and out through the orifice 42. The pressure in the chamber C will be low since the oil flow through the tube 34 will be slow due to the high viscosity of the oil. However, as the oil in the system warms up and becomes of lower viscosity, oil will then flow faster through the pipe 34, thus increasing the pressure in the chamber C with the result that the piston 37 will be moved to the left, thus partially closing the port 27 and partially opening the port 26 so that a portion of the oil will now pass to the tank by way of the cooler. That portion of the oil passing through the cooler will be increased in viscosity and movement of the valve 37 to the left is continued until the ratio of flow through the cooler and by-pass is such that the oil discharged from the engine is of a predetermined viscosity. The valve 37 will move back and forth to maintain the oil at the desired viscosity. The relief valve 20 limits the maximum pressure at which oil is supplied to the cooler 50 regardless of the position of the piston valve 37 and the aeration eliminator 17 assures that the oil passing through the pipe 43a is air free.

Although the inlet port of chamber C has been disclosed as a friction tube and the outlet port has been disclosed as an orifice, it is to be understood that an orifice may be used as the inlet and a friction tube may be used as the outlet, in which event the pipe 49 will be connected to the outlet 23 and the pipe 51 to the outlet 22, and immediately upon starting of the engine, the piston valve 37 will move to open the port 26 and close the port 27 under the influence of the high pressure in the chamber C, such high pressure being due to the fact that oil will escape slowly from the chamber when of high viscosity. As the viscosity of the oil decreases, the pressure in the chamber C will correspondingly decrease and the piston 37 will gradually move back to the right, thereby opening the port 27 and permitting oil to flow through the cooler. By the action of the piston 33 on the needle valve 31, the rate of supply of oil will be so controlled that the pressure on opposite sides of the piston will be maintained constant so that there will be a constant pressure difference across the inlet port, whether the inlet port be a friction tube or an orifice.

It is of course understood that various modifications may be made in the structural details of the device above described, without in any way departing from the spirit of the invention as defined in the appended claims.

We claim:

1. In combination, a dry sump engine, an oil tank, a pump for withdrawing oil from the engine sump, an oil path leading from said pump to said tank, a cooler in said path, a relief valve in said path between said pump and cooler, a by-pass around said cooler having one end joining said path between said relief valve and cooler, a chamber having an inlet port and an outlet port of which one is a friction tube and the other is an orifice, said chamber having its inlet port communicating with said oil path between said pump and relief valve, means for regulating the oil pressure in said chamber as a function of its viscosity, and valve means responsive to the oil pressure in said chamber for regulating flow through said cooler.

2. In combination, a dry sump engine, an oil tank, a pump for withdrawing oil from the engine sump, an oil path leading from said pump to said tank, a cooler in said path, a relief valve in said path between said pump and cooler, a by-pass around said cooler having one end joining said path between said relief valve and cooler, a chamber having an inlet port and an outlet port of which one is a friction tube and the other is an orifice, an aeration eliminator in said path between said pump and relief valve, said chamber having its inlet port communicating with said aeration eliminator, means for regulating the oil pressure in said chamber as a function of its viscosity, and valve means responsive to the oil pressure in said chamber for regulating flow through said cooler.

3. In an oil circulating system, a cooler, means for by-passing oil around said cooler, means for limiting the pressure of the oil supplied to said cooler, viscosity responsive means including a chamber wherein the pressure of oil flowing therethrough is a function of its viscosity, means to divert a portion of the oil from said system through said viscosity responsive means, and valve means responsive to the oil pressure in said chamber for controlling flow through said cooler and by-pass.

4. In combination, a dry sump engine, an oil tank, a system connecting said pump to said tank, a cooler in said system, means for by-passing oil around said cooler, means for limiting the pressure of the oil supplied to said cooler, viscosity responsive means including a chamber wherein the pressure of oil flowing therethrough is a function of its viscosity, means to divert a portion of the oil from said system through said viscosity responsive means, and valve means responsive to the oil pressure in said chamber for controlling flow through said cooler and by-pass.

5. In an oil circulating system, an oil reservoir, a device to be lubricated, a three branch oil path between said reservoir and device, a cooler in one branch, viscosity responsive means in another branch including a chamber wherein the pressure of oil flowing therethrough is a function of its viscosity, valve means responsive to the oil pressure in said chamber for controlling flow through said cooler and the remaining branch, and a relief valve for limiting the pressure of the oil supplied to the cooler.

6. In combination, a dry sump engine, an oil tank, a pump for withdrawing oil from the engine sump, a three branch oil path connecting said pump to said tank, a cooler in one branch, viscosity responsive means in another branch including a chamber wherein the pressure of oil flowing therethrough is a function of its viscosity, valve means responsive to the oil pressure in said chamber for controlling flow through said cooler and the remaining branch, and a relief valve for limiting the pressure of the oil supplied to the cooler.

7. In an oil circulating system, a cooler, means for by-passing oil around said cooler, viscosity responsive means communicating with said system exterior of the ends of said by-passing means and including a chamber wherein the pressure of the oil flowing therethrough is a function of its viscosity, valve means responsive to the pressure in said chamber for controlling flow through said cooler, and valve means for regulating the pressure of oil flowing into said cooler.

8. In an oil circulating system, an oil path containing a pump and a heat exchanger, means for by-passing oil around said heat exchanger, means for regulating the pressure of oil flowing into the heat exchanger, viscosity responsive means communicating with said system between said pump and said pressure regulating means and including a chamber wherein the pressure of the oil flowing therethrough is a function of its viscosity, and valve means responsive to the pressure in said chamber for controlling flow through said heat exchanger.

9. In an oil circulating system, an oil path containing a pump and a heat exchanger, a by-pass around said heat exchanger, valve means for controlling flow through said by-pass and heat exchanger, viscosity responsive means connected with the system between said pump and valve means and including a chamber wherein the pressure of oil flowing therethrough is a function of its viscosity, said valve means being responsive to the pressure in said chamber, and means for regulating the pressure of oil flowing into said heat exchanger.

10. In an oil circulating system, a cooler, means for by-passing oil around said cooler, means for limiting the pressure of the oil supplied to said cooler, a branch path for diverting a portion of the oil in said system around said pressure limiting means, and means for controlling flow through said cooler in response to variation in the viscosity of the oil flowing through said branch path to increase the flow through said cooler upon decrease in the viscosity of the oil in said branch path and to decrease the flow through said cooler upon increase in the viscosity of the oil in said branch path.

11. In combination, a dry sump engine, an oil tank, a system connecting said pump to said tank, a cooler in said system, means for by-passing oil around said cooler, means for limiting the pressure of the oil supplied to said cooler, a branch path for diverting a portion of the oil in said system around said pressure limiting means, and means for controlling flow through said cooler in response to variation in the viscosity of the oil flowing through said branch path to increase the flow through said cooler upon decrease in the viscosity of the oil in said branch path and to decrease the flow through said cooler upon increase in the viscosity of the oil in said branch path.

HENRY B. CLARKE.
HARRY T. BOOTH.

DISCLAIMER 2,140,735.—*Henry B. Clarke*, Grosse Pointe, Mich., and *Harry T. Booth*, Glencoe, Ill. VISCOSITY REGULATOR. Patent dated December 20, 1938. Disclaimer filed November 12, 1942, by the assignee, *Lubrication Power Corporation*, and the licensee, *Henry B. Clarke*.

Hereby enter this disclaimer to claims 3 to 11 inclusive.

[*Official Gazette December 22, 1942.*]